United States Patent [19]
Kitade et al.

[11] Patent Number: 5,978,411
[45] Date of Patent: Nov. 2, 1999

[54] SYNCHRONIZER FOR RECEIVER OF SPREAD SPECTRUM COMMUNICATION APPARATUS

[75] Inventors: Takashi Kitade; Taku Nagase, both of Tokyo, Japan

[73] Assignee: Matsushita Electric Industrial Co., Ltd., Osaka, Japan

[21] Appl. No.: 08/822,595

[22] Filed: Mar. 20, 1997

[30] Foreign Application Priority Data

Mar. 22, 1996 [JP] Japan ................................ 8-091858

[51] Int. Cl.$^6$ .............................. H04B 15/00; H04K 1/00; H04L 27/30
[52] U.S. Cl. ............................................ 375/200; 327/141
[58] Field of Search ................................ 375/200, 208, 375/316, 346, 348, 371; 327/141, 145, 146

[56] References Cited

U.S. PATENT DOCUMENTS

| | | | |
|---|---|---|---|
| 4,701,934 | 10/1987 | Jasper ................................ | 375/200 |
| 4,785,463 | 11/1988 | Janc et al. ........................ | 375/200 |
| 5,062,122 | 10/1991 | Pham et al. ...................... | 375/200 |
| 5,570,349 | 10/1996 | Bustamante et al. ............ | 375/206 |
| 5,644,591 | 7/1997 | Sutton .............................. | 375/200 |
| 5,764,188 | 6/1998 | Ghosh et al. .................... | 342/457 |
| 5,796,776 | 8/1998 | Lomp et al. ...................... | 375/222 |
| 5,799,010 | 8/1998 | Lomp et al. ...................... | 370/335 |
| 5,822,364 | 10/1998 | Yamada et al. .................. | 375/200 |
| 5,896,423 | 4/1999 | Okamoto .......................... | 375/345 |
| 5,903,593 | 5/1999 | Ishiguro et al. .................. | 375/200 |

FOREIGN PATENT DOCUMENTS 63-84219  4/1988  Japan .

*Primary Examiner*—Chi H. Pham
*Assistant Examiner*—Bryan Webster
*Attorney, Agent, or Firm*—Pearne, Gordon, McCoy & Granger LLP

[57] ABSTRACT

A search unit of a receiver synchronizer includes a search PN signal generator for generating PN signals for all PN phases in order to search the maximum power path; a search correlation unit which outputs a correlation value from sampling data and the PN signal; a data buffer for storing the correlation value; a path search unit for controlling a search the path using the correlation value received from the data buffer; a PN signal generator for outputting a PN signal to a DLL and a data demodulation correlation device; and a DLL switch for switching the PN phase to the phase of the maximum power path by controlling the PN signal generator as a result of the search for the path. The PN phase of the PN signal output to the DLL is constantly maintained in synchronization with the phase of the maximum power path.

8 Claims, 9 Drawing Sheets

SYNCHRONIZER FOR RECEIVER OF SPREAD SPECTRUM COMMUNICATION APPARATUS

BACKGROUND OF THE INVENTION

1. Field of the Invention

The present invention relates to a synchronizer to be incorporated into a receiver of a spread spectrum communication apparatus used in digital mobile radio communication.

2. Description of the Related Art

Figure 9:
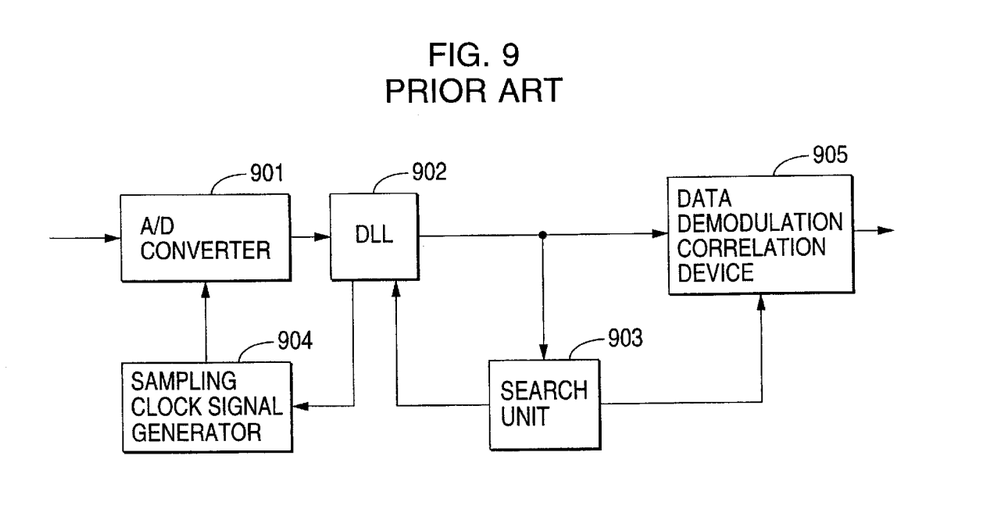
FIG. 9 is a block diagram illustrating the configuration of a receiver synchronizer of the conventional spread spectrum communication apparatus.
Figure 10:
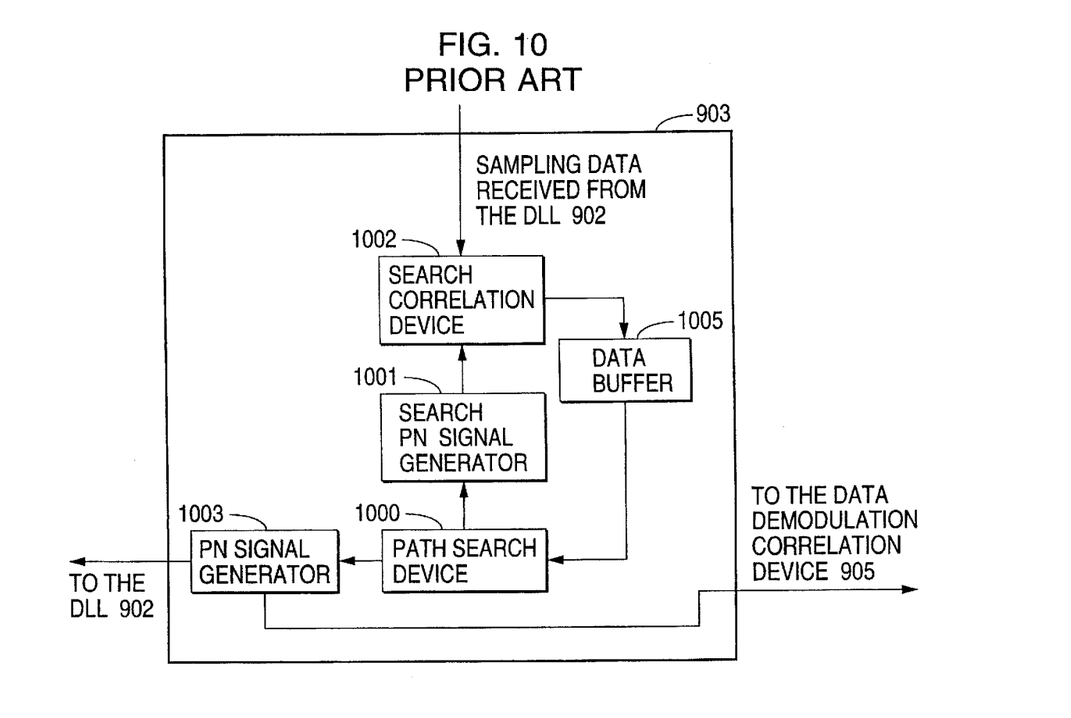
FIG. 10 is a detailed block diagram of a search unit of the receiver synchronizer of the conventional spread spectrum communication apparatus illustrated in FIG. 9.

The conventional spread spectrum communication apparatus synchronizes with sampling data which is received and subjected to A/D conversion, searches data having the optimum phase and despreads the data having the optimum phase to demodulate the received data. For instance, a synchronizer of such a conventional spread spectrum communication apparatus is shown in FIGS. 9 and 10. FIG. 9 is a block diagram illustrating the configuration of a receiver synchronizer of the conventional spread spectrum communication apparatus, and FIG. 10 is a detailed block diagram of a search unit of the receiver synchronizer of the conventional spread spectrum communication apparatus illustrated in FIG. 9.

First, referring to FIG. 9, the configuration of the receiver synchronizer of the conventional spread spectrum communication apparatus will be described. In FIG. 9, reference numeral 901 designates an A/D converter for converting a received signal from an analog signal to a digital signal; 902, a DLL (Delay Lock Loop) for time tracking a PN (pseudonoise) signal so as to be in phase with it while sampling data output from the A/D converter is correlated with the PN signal; 903, a search unit for searching the data received through a path from which the maximum power is obtained (a path over which the received signal flows from a transmitter to a receiver or a signal received through this path), using the correlation result calculated from an output of a correlation device; 904, a sampling clock signal generator controlled by the DLL; and 905, a data demodulation correlation device for despreading the received data.

With reference to FIG. 10, the configuration of a receiver synchronizer of the conventional spread spectrum communication apparatus illustrated in FIG. 9 will be described. In FIG. 10, reference numeral 1001 designates a search PN signal generator for generating PN signals having all PN phases (phases of the pseudonoise signals); 1002, a search correlation unit for correlating the sampling data with the PN signal to output correlation data corresponding to the correlation; 1005, a data buffer for storing the correlation data output from the search correlation unit 1002; 1000, a path search unit which controls the search PN signal generator so as to search to select for the correlation data corresponding the maximum-power path from the data buffer 1005 and outputs the PN phase of the thus-searched correlation data; and 1003, a PN signal generator for outputting a PN signal to the DLL 902.

With reference to FIGS. 9 and 10, the operation of the receiver synchronizer of the conventional spread spectrum communication apparatus will be described. First, the DLL 902 is placed into an inoperative state, and the timing of the operating sampling clock signal generator 904, which controls the sampling timing of the A/D converter 901, is made constant. A received signal is sampled at predetermined timing by the A/D converter 901, and the thus-sampled received signal is input into the search unit 903.

The search correlation unit 1001 correlates the sampling data input to the search unit 903 with the PN signal output from the search PN signal generator 1001. The resultant correlated data is stored in the data buffer 1005. When the search results regarding all the PN phases is stored in the data buffer 1005, the correlation data obtained from the maximum-power path is searched to be selected from all data stored in the buffer (a searching operation).

A PN phase with respect to the maximum-power path is output to the PN signal generator 1003, and the DLL 902 is activated by the PN phase, thereby commencing a tracking operation (a tracking operation). Further, the PN signal output from the PN signal generator 1003 is output to the data demodulation correlation device 905, thereby commencing demodulation of data. After completion of the searching operation, the phase of the PN signal generator 1003 remains unchanged, and the time tracking of the path is carried out by use of the PN phase of the PN signal generator which is set at the time of completion of the searching operation (a synchronous period).

As described above, the receiver synchronizer of the conventional spread spectrum is arranged so as to synchronously track the path by operating only the DLL 902 without altering the phase of the PN signal generator 1003 after the completion of the searching operation. Accordingly, if the level of the path tracked by the DLL 902 is significantly reduced for reasons of e.g., fading, the DLL 902 comes out of synchronization with the path. If the DLL 902 comes out of synchronization with the path, it is impossible to demodulate the data. In order to demodulate the data, all the operations must be carried out once again from the first searching operation.

SUMMARY OF THE INVENTION

It is an object of the present invention to provide a spread spectrum communication apparatus capable of preventing to being out of synchronization with the path without executing a searching operation from the beginning.

In the spread spectrum communication apparatus of the present invention, if the level of a path tracked by a DLL is significantly fallen for reasons of fading and the like, the phase of the PN signal output to the DLL is switched to the phase of the maximum power path of all the currently existing paths before the DLL comes out of synchronization with the path. Even if the synchronization of the DLL temporarily comes out of synchronization with the path, the phase of the PN signal output to the DLL is switched to the phase of the maximum power path of all the currently existing paths.

In the spread spectrum communication apparatus of the present invention, the phase of a PN signal output to a DLL is made equal to that of a PN signal for data demodulation purposes, and the PN signal output to the DLL is always switched to the phase of a path of a received signal having the maximum power.

Further, in the spread spectrum communication apparatus of the present invention, the phase of a PN signal output to a DLL is made independent of the phase of a PN signal for data demodulation purposes, and if the sum of electric power of the first through Nth sampled electric power as the center is the phase of the PN signal output to the DLL is less than a predetermined value, a PN phase of a PN signal generator which outputs the PN signal to the DLL is switched to the phase of the maximum power path.

Accordingly, it is possible to obtain the spread spectrum communication apparatus capable of preventing to being out of synchronization with the path.

More specifically, the DLL continues the level monitoring regarding to the paths other than the path which is currently tracked by the DLL. If the level of the path tracked by the DLL falls significantly due to; e.g., fading, the phase of the PN signal output to the DLL is switched to the other maximum power path before the DLL comes out of synchronization with the path. Alternatively, even if the DLL temporarily comes out of synchronization with the path, the phase of the PN signal output to the DLL is immediately switched to the phase of the currently-existing path of the received signal having the maximum power. Therefore, it is possible to prevent the DLL from coming out of synchronization with the path.

DETAILED DESCRIPTION OF THE INVENTION

Detailed description of the present invention will be described as follow.

A spread spectrum communication apparatus according to the present invention includes a DLL for tracking a PN signal with respect to sampling data received from an A/D converter, a search unit for searching a path from which a received signal having the maximum electric power is obtained, and a data demodulation correlation device for demodulating the received signal by despreading it. The search unit searches the PN phase of the maximum power path from correlation data obtained by correlating the PN signal of each PN phase with the sampling data. The search unit includes a unit for outputting the PN signal having the PN phase to the DLL and the data demodulation correlation device, and a PN signal switching unit for switching the PN phase of the PN signal output from the PN signal output unit to the phase of the maximum power path. The PN phase of the PN signal output to the DLL is made equal to the phase of the PN signal for data demodulation purposes. Accordingly, the PN phase of the PN signal is always in synchronization with the phase of the maximum power path. Therefore, since the phase of the PN signal output to the DLL is switched to the phase of the other maximum power path before the DLL comes out of synchronization with the path, the DLL is prevented from coming out of synchronization with the path.

In the apparatus according to the present invention, the unit for outputting the PN signal having the PN phase may include a search PN signal generator, a search correlation unit, a data buffer, a path search unit, and a PN signal generator. The search PN signal generator generates the PN signal having the PN phase. The search correlation unit for outputting correlation data by correlating the sampling data with the PN signal. The data buffer for storing the correlation data. The path search unit which searches the correlation data on the maximum power path from the data buffer and outputs the PN phase of the path. The PN signal generator which outputs the PN signal with the PN phase received from the path search unit to the DLL and the data demodulation correlation device. The PN signal switching unit includes a DLL switch for switching the PN phase of the PN signal output from the PN signal generator to the phase of the maximum power path. Therefore, since the phase of the PN signal output to the DLL is switched to the phase of the other maximum power path before the DLL comes out of synchronization with the path, the DLL is prevented from coming out of synchronization with the path.

In the spread spectrum communication apparatus according to the present invention, the PN signal switching unit may include an adder, a threshold value output device and a comparator. The adder reads the correlation data of one or more sample centered with respect to the PN phase of the PN signal output to the PN signal generator and calculates the sum of the thus-read correlation data. The threshold value output device outputs a predetermined threshold value. The comparator compares the output from the adder and the predetermined threshold value to determine as to whether or not the PN signal output to the DLL is switched so as to control the DLL switch. Then, the PN phase of the PN signal is switched to the phase of the maximum power path when the output of the adder falls to less than the predetermined threshold value. Accordingly, since the path of the DLL is switched by using the predetermined threshold value as the reference, it is not necessary to frequently switch the phase of the PN signal output to the DLL, thereby resulting in stable control operation of the DLL. If the DLL temporarily comes out of synchronization with the path, the DLL is brought into synchronization with the path by immediately switching the phase of the PN signal output to the DLL to the phase of the other currently-existing maximum power path.

Alternatively, in the spread spectrum communication apparatus according to the present invention, the PN signal switching unit may includes an adder, a threshold value output device, a multiplier and a comparator. The adder reads the correlation data of one or more sample centered with respect to the PN phase of the PN signal output to the PN signal generator, and calculates the sum of the thus-read correlation data. The threshold value output device outputs a predetermined threshold value. The multiplier multiplies the correlation data on the maximum power path read from the data buffer by the predetermined threshold value. The comparator compares the output of the adder and the threshold of the multiplier to determine as to whether or not the PN signal output to the DLL is switched so as to controls the DLL switch, whereby the PN phase of the PN signal is switched to the phase of the maximum power path when the output of the adder falls to less than X % of the predetermined threshold value. Therefore, since the switching conditions is used as the reference for the electric power of actually received signal and the paths other than the path tracked by the DLL are always monitored, the control operation of the DLL is further made stable.

Alternatively, in the spread spectrum communication apparatus according to the present invention, the PN signal switching unit includes an adder, a threshold value output device, a noise level output device, a multiplier and a comparator. The adder reads the correlation data of one or more sample centered with respect to the PN phase of the PN signal output to the PN signal generator, and calculates the sum of the thus-read correlation data. The threshold value output device outputs a predetermined threshold value. The a noise level output device measures the level of noise included in the sampling data and outputs the thus-measured noise level. The multiplier multiplies the output of the noise level output device by the predetermined threshold value. The comparator compares the output of the adder with the threshold value of the multiplier to determine whether or not the PN signal output to the DLL is switched so as to control the DLL switch, whereby the PN phase of the PN signal is switched to the phase of the maximum power path when the output of the adder falls to less than X % of the measured noise level. Therefore, since the noise data measured by the noise level measurement device is used as the switching conditions of the DLL, it is possible to correctly switch the DLL using the signal in place of noise.

Alternatively, in the spread spectrum communication apparatus according to the present invention, the PN signal switching unit includes an adder, a threshold value and a comparator. The adder reads the correlation data of one or more sample centered with respect to the PN phase of the PN signal output to the PN signal generator and calculates the sum of the thus-read correlation data. The threshold value output device for outputting a predetermined threshold value. The comparator compares the output of the adder with the predetermined threshold value to determine whether or not the PN signal output to the DLL is switched so as to controls the DLL switch. The search unit has a data PN signal generator for generating the PN signal to be output to the data demodulation correlation device, whereby the PN phase of the PN signal output to the DLL is switched to the phase of the maximum power path independently of the PN signal output to the data demodulation correlation device when the output of the adder falls to less than the predetermined threshold value. Therefore, the data can be demodulated without being affected by drifts resulting from switching of the DLL caused for reasons of a large time constant of the DLL loop filter, so that superior receiving characteristics can be achieved.

Alternatively, in the spread spectrum communication apparatus according to the present invention, the PN signal switching unit includes an adder, a threshold value, a multiplier, a comparator. The adder reads the correlation data of one or more sample centered with respect to the PN phase of the PN signal output to the PN signal generator, and calculates the sum of the thus-read correlation data. The threshold value output device for outputting a predetermined threshold value. The multiplier for multiplying the correlation data on the maximum power path read from the data buffer by the predetermined threshold value. The comparator compares the output of the adder with the predetermined threshold value to determine whether or not the PN signal output to the DLL is switched so as to controls the DLL switch. The search unit includes a data PN signal generator for generating the PN signal to be output to the data demodulation correlation device, whereby the PN phase of the PN signal output to the DLL is switched to the phase of the maximum power path independently of the PN signal output to the data demodulation correlation device when the output of the adder falls to less than X % of the maximum power path. The data can be demodulated without being affected by drifts resulting from switching of the DLL, and stable control operation of the DLL can be ensured.

Alternatively, in the spread spectrum communication apparatus according to the present invention, the PN signal switching unit includes an adder, a threshold value output device, a noise level output device, a multiplier and a comparator. The adder reads the correlation data of one or more sample centered with respect to the PN phase of the PN signal output to the PN signal generator, and calculates the sum of the thus-read correlation data. The threshold value output device outputs a predetermined threshold value. The a noise level output device measures the level of noise included in the sampling data and outputs the thus-measured noise level. The multiplier multiplies the output of the noise level output device by the predetermined threshold value. The comparator compares the output of the adder with the threshold value of the multiplier to determine whether or not the PN signal output to the DLL is switched so as to control the DLL switch. The search unit includes a data PN signal generator for generating the PN signal to be output to the data demodulation correlation device, whereby the PN phase of the PN signal output to the DLL is switched to the phase of the maximum power path independently of the PN signal output to the data demodulation correlation device when the output of the adder falls to less than X % of the maximum power path. Therefore, the data can be demodulated without being affected by drifts resulting from switching of the DLL, and the DLL can be switched using a correct path.

With reference to the accompanying drawings, preferred embodiments of the present invention will be described in detail as follows.

Figure 1:
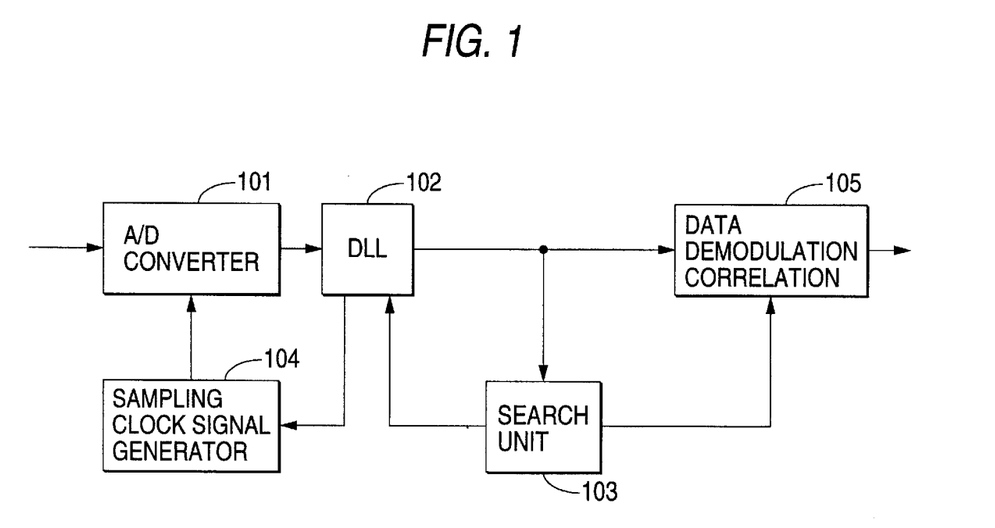
FIG. 1 is a block diagram illustrating the configuration of a receiver synchronizer of a spread spectrum communication apparatus according to the present invention.

First, with reference to FIG. 1, the synchronizer of the receiver of the spread spectrum communication apparatus of the present invention will be described. In FIG. 1, reference numeral 101 designates an A/D converter for converting a received signal from analog to digital; 102, a Delay Lock Loop (hereinafter referred to as DLL) for time tracking a PN signal to prevent the phase of a sampled data output from the A/D converter from shifting from the phase of the PN signal in the correlation of the sampling data and the PN signal; 103, a search unit for searching to select the data received through a path from which the maximum power is obtained (hereinafter referred to as a "path having the maximum power" or the "maximum power path"), using the correlation result calculated from an output of a correlation device; 104, a sampling clock signal generator controlled by the DLL 102; and 105, a data demodulation correlation device for despreading the received data.

Figure 2:
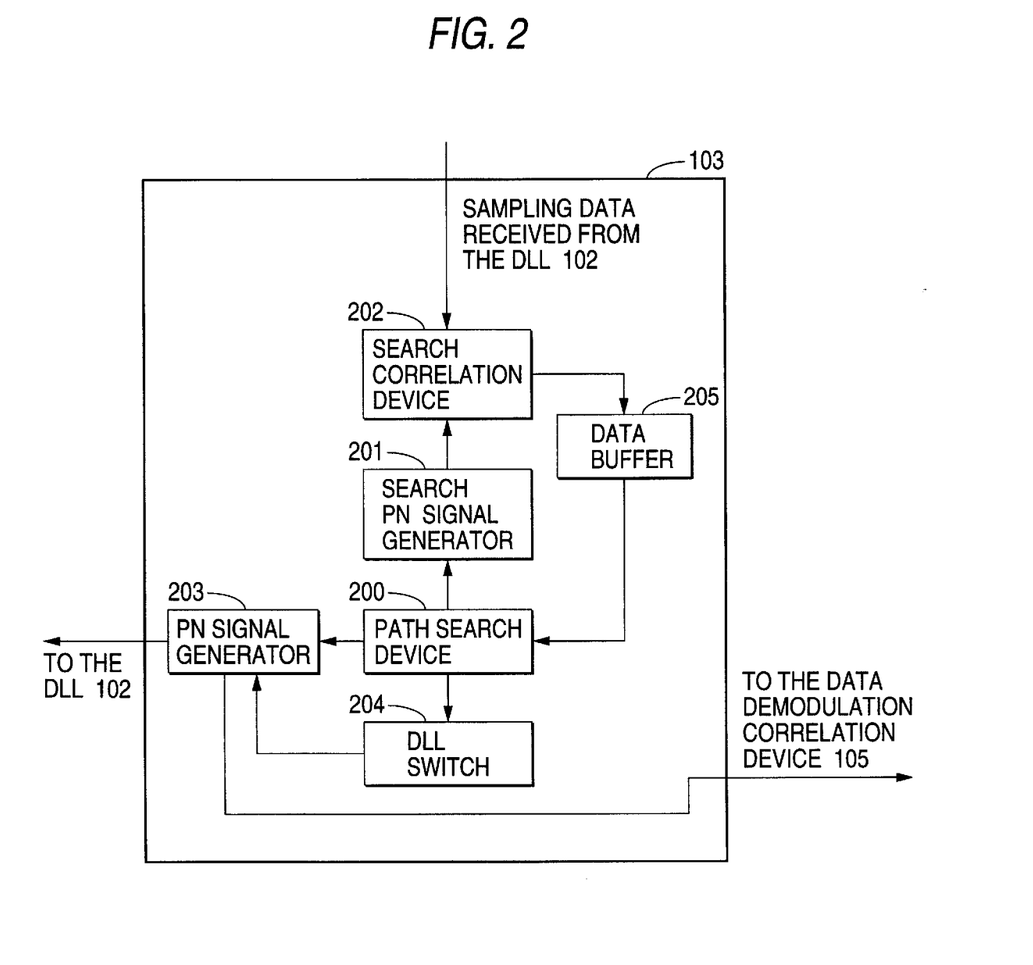
FIG. 2 is a detailed block diagram of a search unit according to a first embodiment of the receiver synchronizer of the spread spectrum communication apparatus of the present invention.

With reference to FIG. 2, the configuration of the search unit according to the first embodiment of the receiver synchronizer of the spread spectrum communication apparatus of the present invention illustrated in FIG. 1. FIG. 2 illustrates the details of the search unit 103 illustrated in FIG. 1. In FIG. 2, reference numeral 201 designates a search PN signal generator for generating PN signals with regard to all the PN phases in order to search the maximum power path; and 202, a search correlation unit which correlates received sampling data with the PN signal of the PN phase actually received from the search PN signal generator 201 and outputs resultant correlation data.

Moreover, reference numeral 205 designates a data buffer for storing certain correlation data which is the result of a searching operation of the search correlation unit 202; 203, a PN signal generator for outputting a PN signal to the DLL 102; 200, a path search unit which controls the search PN signal generator 201, searches the maximum power path from the correlation data stored in the data buffer 205, and outputs the PN phase of thus searched maximum power path; and 204, a DLL switch which switches the PN phase of the PN signal output to the DLL 102 to the phase of the maximum power path for each search across all the PN phases on the basis of the result of the path searching operation performed by the path search unit 200.

Next, with reference to FIGS. 1 and 2, the operation of the receiver synchronizer of the spread spectrum communication apparatus of the first embodiment according to the present invention will be described. While the DLL 102 is placed in an inoperative state, and the timing of the sampling clock signal generator 104 which is currently in operation and controls the sampling timing of the A/D converter 101 is made constant. A received signal is sampled at predetermined timing by the A/D converter 101, and thus sampled received signal is input to the search unit 103.

The search correlation unit 202 correlates the sampling data input to the search unit 103 with the PN signal output from the search PN signal generator 201. The correlation data output from the search correlation unit 202 is stored in the data buffer 205. When the correlation data regarding all the PN phases are stored in the data buffer 205, the path search unit 200 selects the maximum-power path from the correlation data. The PN phase of the maximum power path is output to the PN signal generator 203 to activate the DLL 102 so as to commence a tracking operation.

The PN signal output from the PN signal generator 203 is also output to the data demodulation correlation device 105 thereby commencing demodulation of the data. Even during the tracking operation, the search unit 103 remains in operation. When the correlation data regarding all the PN phases are stored in the data buffer 205, the path search unit 200 selects the maximum-power path from the correlation data. If the PN phase of the maximum power path is different from the path of the previous maximum power path, the DLL switch 204 outputs the PN signal having the PN phase of the maximum power path to the PN signal generator 203.

As described above, the spread spectrum communication apparatus according to the first embodiment of the present invention is provided with the DLL switch 204 for switching the PN phase of the PN signal generator 203 outputting a PN signal to the DLL 102 to the phase of the maximum power path selected by the path search unit 200. As a result, in a case where the level of the path tracked by the DLL 102 is significantly fallen for reasons of; e.g., fading, the phase of the PN signal output to the DLL 102 is switched to the phase of the other currently-existing maximum power path before coming out-of the synchronization of the DLL 102, thereby preventing the DLL 102 from coming out of synchronization with the path.

Figure 3:
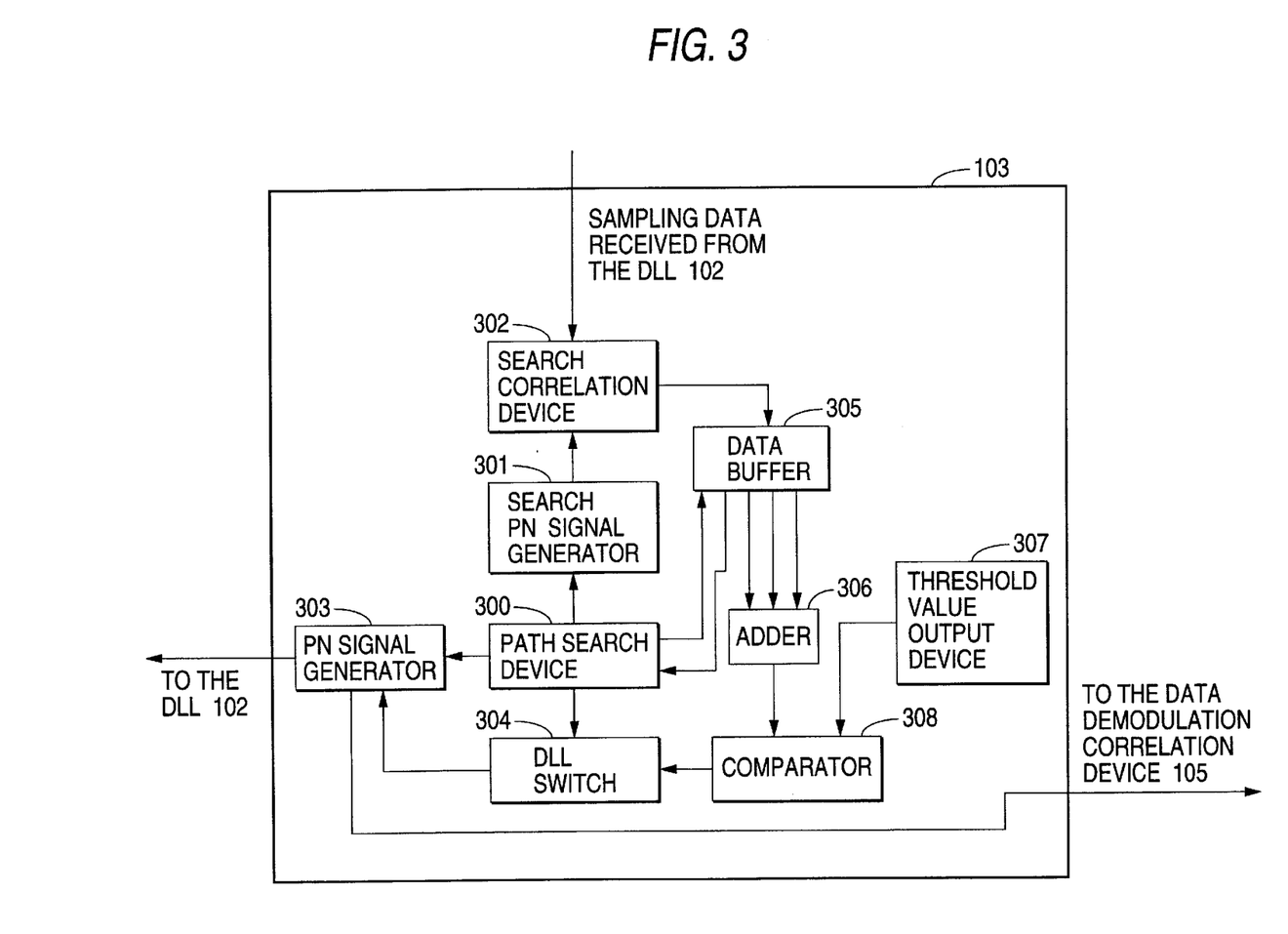
FIG. 3 is a detailed block diagram of a search unit according to a second embodiment of the receiver synchronizer of the spread spectrum communication apparatus of the present invention.

With reference to FIG. 3, an explanation will be given of the configuration of the search unit according to the second embodiment of the receiver synchronizer of the spread spectrum communication apparatus of the present invention illustrated in FIG. 1. The search unit 103 illustrated in FIG. 3 shows the search unit 103 provided in FIG. 1 in detail. In FIG. 3, reference numeral 301 designates a search PN signal generator for generating PN signals with regard to all PN phases in order to search the maximum power path; 302, a search correlation unit which correlates the received sampling data with the PN signal having the PN phase actually received from the search PN signal generator 301 and outputs resultant correlation data; and 305, a data buffer for storing correlation data which are search results received from the search correlation unit 302.

Further, reference numeral 303 designates a PN signal generator for outputting a PN signal to the DLL 102; 300, a path search unit which controls the search PN signal generator 301, searches the maximum power path from the correlation data stored in the data buffer 305, and outputs the PN phase of thus searched maximum power path; 304, a DLL switch which switches the PN phase of the PN signal output to the DLL 102 to the phase of the maximum power path for each search across all the PN phases on the basis of the result of the path searching operation performed by the path search unit 300; 306, an adder for calculating the sum of first through Nth sampled correlation data as the center is the PN phase of the PN signal output to the PN signal generator 303; 307, a threshold value output device for outputting a constant threshold value (hereinafter referred to as a fixed threshold value); and 308, a comparator for determining whether or not the PN phase of the PN signal output to the DLL 102 is switched by comparing the output of the adder 306 with the threshold value of the threshold value output device 307.

Next, with reference to FIGS. 1 and 3, the operation of the receiver synchronizer of the spread spectrum communication apparatus of the second embodiment of the present invention will be described. First, while the DLL 102 is placed in an inoperative state, and the timing of the sampling clock signal generator 104 which is currently in operation and controls the sampling timing of the A/D converter 101 is made constant. A received signal is sampled at predetermined timing by the A/D converter 101, and thus sampled received signal enters the search unit 103.

The search correlation unit 302 correlates the sampling data input to the search unit 103 with the PN signal output from the search PN signal generator 301. The correlation data output from the search correlation unit 302 is stored in the data buffer 305. When the correlation data regarding all the PN phases are stored in the data buffer 305, the path search unit 300 selects the maximum-power path from the correlation data. The PN phase of the maximum power path is output to the PN signal generator 303 thereby to activate the DLL 102 so as to commence a tracking operation. Further, the PN signal output from the PN signal generator 303 is output to the data demodulation correlation device 105, thereby commencing demodulation of the data.

Even during the tracking operation, the search unit 103 remains in operation. When the correlation data regarding all the PN phases is stored in the data buffer 305, the path search unit 300 selects the maximum-power path from the correlation data. Read from the data buffer 305 are the first to Nth sampled correlation data as the center is the PN phase of the PN signal output to the PN signal generator 303. Thus read correlation data are added up by the adder 306. The comparator 308 compares the fixed threshold value output from the threshold value output device 307 with the output of the adder 306. The moment the output of the adder 306 falls to less than the threshold value, the PN phase of the maximum power path read from the data buffer 305 is output from the path search unit 300 to the PN signal generator 303 under control of the DLL switch 304 which receives the comparison result from the comparator 308.

As described above, the spread spectrum communication apparatus according to the second embodiment of the present invention is provided with the DLL switch 304 which switches the PN phase of the PN signal output from the PN signal generator 303 to the DLL 102 to the phase of the maximum power path the moment at which the sum of the first to Nth sampled electric power as the center is the phase of the PN signal output to the DLL 102 falls to less than the fixed threshold value. As a result, the path of the DLL 102 is switched using the fixed threshold value as the reference, thereby being unnecessary to frequently switching the phase of the PN signal output to the DLL 102. Accordingly, the control operation of the DLL 102 becomes stable. Even if the DLL 102 comes out of synchronization with the path, the DLL 102 can be brought into synchronization with the path again by immediately switching the phase of the PN signal output to the DLL 102 to the phase of the other maximum power path.

Figure 4:
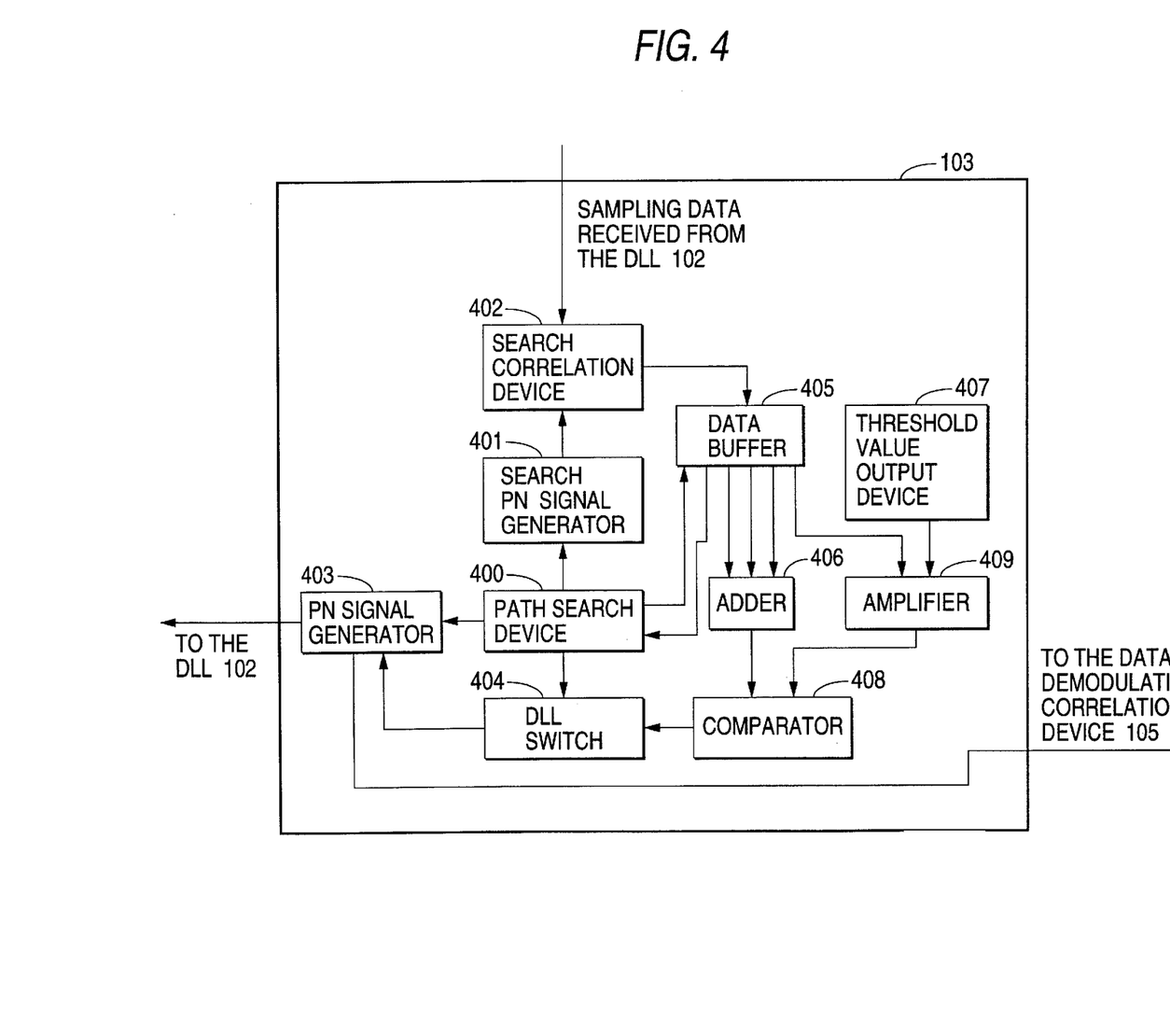
FIG. 4 is a detailed block diagram of a search unit according to a third embodiment of the receiver synchronizer of the spread spectrum communication apparatus of the present invention.

With reference to FIG. 4, an explanation will be given of the configuration of the search unit according to the third embodiment of the receiver synchronizer of the spread spectrum communication apparatus of the present invention illustrated in FIG. 1. The search unit 103 illustrated in FIG. 4 shows the search unit 103 provided in FIG. 1 in detail. In FIG. 4, reference numeral 401 designates a search PN signal generator for generating PN signals with regard to all PN phases; 402, a search correlation unit which correlates the received sampling data with the PN signal having the PN phase actually received from the search PN signal generator 401 and outputs resultant correlation data; 405, a data buffer for storing correlation data which are search results received from the search correlation unit 402; and 403, a PN signal generator for generating a PN signal output to the DLL 102.

Further, reference numeral 400 designates a path search unit which controls the search PN signal generator 401, searches the maximum power path from the correlation data stored in the data buffer 405 and outputs the PN phase of thus searched maximum power path; 404, a DLL switch which switches the PN phase of the PN signal output to the DLL 102 to the phase of the maximum power path for each search across all the PN phases on the basis of the result of the path searching operation performed by the path search unit 400; 406, an adder for calculating the sum of first through Nth sampled correlation data as the center is the PN phase of the PN signal output to the PN signal generator 403; 407, a threshold value output device for outputting a fixed threshold value; 409, a multiplier for multiplying the output from the correlation device with respect to the maximum power path selected by the path search unit 400 by the fixed threshold value; and 408, a comparator for determining whether or not the PN phase of the PN signal output to the DLL 102 is switched by comparing the output of the adder 406 with the output of the multiplier 409.

Next, with reference to FIGS. 1 and 4, the operation of the receiver synchronizer of the spread spectrum communication apparatus of the third embodiment of the present invention will be described. First, while the DLL 102 is placed in an inoperative state, the timing of the sampling clock signal generator 104 which is currently in operation and controls the sampling timing of the A/D converter 101 is made constant. A received signal is sampled at predetermined timing by the A/D converter 101 and thus sampled received signal is input into the search unit 103.

The search correlation unit 402 correlates the sampling data input to the search unit 103 with the PN signal output from the search PN signal generator 401. The correlation data output from the search correlation unit 402 is stored in the data buffer 405. When the correlation data regarding all the PN phases are stored in the data buffer 405, the path search unit 400 selects the maximum-power path from the correlation data. The PN phase of the maximum power path is output to the PN signal generator 403 to thereby activate the DLL 102 so as to commence a tracking operation. Further, the PN signal output from the PN signal generator 403 is also output to the data demodulation correlation device 105, thereby commencing demodulation of the data. Even during the tracking operation, the search unit 103 remains in operation. When the correlation data regarding all the PN phases are stored in the data buffer 405, the path search unit 400 selects the maximum-power path from the correlation data.

Furthermore, read from the data buffer 405 are the first to Nth sampled correlation data as the center is the PN phase of the PN signal output to the PN signal generator 403. Thus read correlation data are added up by the adder 406. The correlation data on the maximum power path selected by the path search unit 400 is read from the data buffer 405, and the multiplier 409 multiplies thus read correlation data by the threshold value output from the threshold value output device 407. The comparator 408 compares the output of the multiplier 409 with the output of the adder 406. The moment the output of the adder 406 falls to less than the threshold value output from the multiplier 409, the PN phase of the maximum power path read from the data buffer 405 is output from the path search unit 400 to the PN signal generator 403 under control of the DLL switch 404 which receives the comparison result from the comparator 408.

As described above, the spread spectrum communication apparatus according to the third embodiment of the present invention is provided with the DLL switch 404 which switches the PN phase of the PN signal output from the PN signal generator 403 to the DLL 102 to the phase of the maximum power path the moment at which the sum of the first to Nth sampled electric power as the center is the phase of the PN signal output to the DLL 102 falls to less than X % of the maximum power path. The switching conditions of the DLL 102 can be changed by the threshold using as the electric power of an actually received signal as the reference. Consequently, the control operation performed by the DLL 102 can be made stable.

Figure 5:
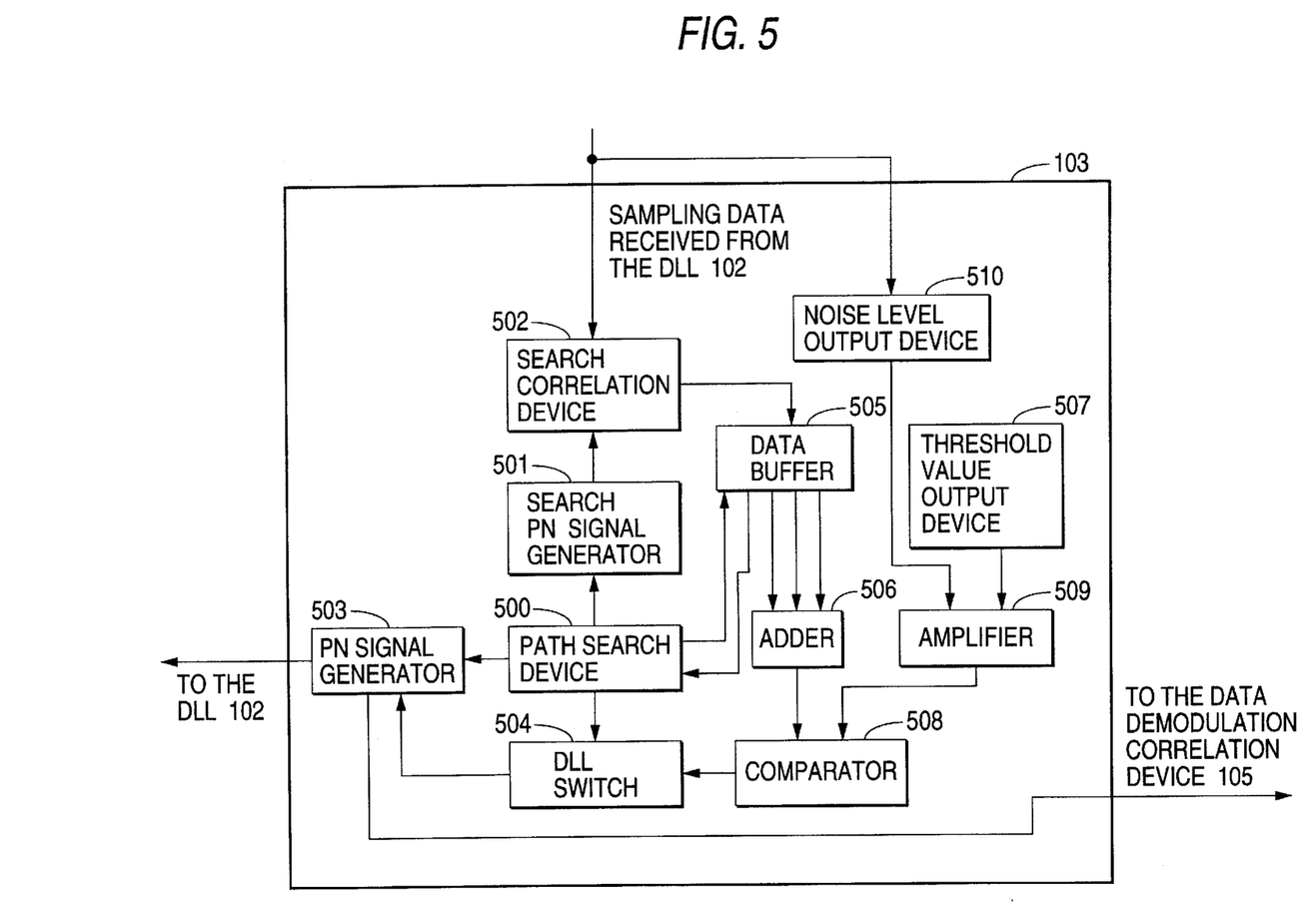
FIG. 5 is a detailed block diagram of a search unit according to a fourth embodiment of the receiver synchronizer of the spread spectrum communication apparatus of the present invention.

With reference to FIG. 5, an explanation will be given of the configuration of the search unit according to the fourth embodiment of the receiver synchronizer of the spread spectrum communication apparatus of the present invention illustrated in FIG. 1. The search unit 103 illustrated in FIG. 5 shows the search unit 103 provided in FIG. 1 in detail. In FIG. 5, reference numeral 501 designates a search PN signal generator for generating PN signals with regard to all PN phases; 502, a search correlation unit which correlates the received sampling data with the PN signal having the PN phase actually received from the search PN signal generator 501 and outputs resultant correlation data; 505, a data buffer for storing correlation data which are search results received from the search correlation unit 502; and 503, a PN signal generator for generating a PN signal output to the DLL 102.

Further, reference numeral 500 designates a path search unit which controls the search PN. signal generator 501, searches the maximum power path from the correlation data stored in the data buffer 505 and outputs the PN phase of thus searched maximum power path; 504, a DLL switch which switches the PN phase of the PN signal output to the DLL 102 to the phase of the maximum power path for each search across all the PN phases on the basis of the result of the path searching operation performed by the path search unit 500; 506, an adder for calculating the sum of first through Nth sampled correlation data as the center is the PN phase of the PN signal output to the PN signal generator 503; 507, a threshold value output device for outputting a fixed threshold value; 510 designates a noise level output device for outputting a noise level by measuring the level of noise of the sampling data; 509 designates a multiplier for multiplying the output of the noise level output device 510 by the fixed threshold value of the threshold value output device 507; and 508, a comparator for determining whether or not the PN phase of the PN signal output to the DLL 102 is switched by comparing the output of the adder 506 with the output of the multiplier 509.

Next, with reference to FIGS. 1 and 5, the operation of the receiver synchronizer of the spread spectrum communication apparatus of the fourth embodiment of the present invention will be described. First, while the DLL 102 is placed in an inoperative state, the timing of the sampling clock signal generator 104 which is currently in operation and controls the sampling timing of the A/D converter 101 is made constant. A received signal is sampled at predetermined timing by the A/D converter 101, and thus sampled received signal is input into the search unit 103.

The search correlation unit 502 correlates the sampling data input to the search unit 103 with the PN signal output from the search PN signal generator 501. The correlation data output from the search correlation unit 502 is stored in the data buffer 505. When the correlation data regarding all the PN phases are stored in the data buffer 505, the path search unit 500 selects the maximum-power path from the correlation data. The PN phase of the maximum power path is output to the PN signal generator 503 thereby to activate the DLL 102 so as to commence a tracking operation.

Further, the PN signal output from the PN signal generator 503 is output to the data demodulation correlation device 105, thereby commencing demodulation of the data. Even during the tracking operation, the search unit 103 remains in operation. At the point in time when the correlation data regarding all the PN phases have been stored in the data buffer 505, the path search unit 500 selects the maximum-power path from the correlation data. Read from the data buffer 505 are the first to Nth sampled correlation data as the center is the PN phase of the PN signal output to the PN signal generator 503. The thus-read correlation data are added up by the adder 506.

The multiplier 509 multiplies an output from the noise level output device 510 which measures the noise level of the sampling data to thereby output the noise level by the threshold value output from the threshold value device 507. The comparator 508 compares the output of the multiplier 509 with the output of the adder 506. The moment the output of the adder 506 falls to less than the threshold value output from the multiplier 509, the PN phase of the maximum power path read from the data buffer 505 is output from the path search unit 500 to the PN signal generator 503 under control of the DLL switch 504 which receives the comparison result from the comparator 508.

As described above, the spread spectrum communication apparatus according to the fourth aspect of the present invention is provided with the DLL switch 504 which switches the PN phase of the PN signal output from the PN signal generator 503 to the DLL 102 to the phase of the maximum power path the moment at which the sum of the first to Nth as the center is the phase of the PN signal output to the DLL 102 falls to less than X % of the noise level measured by the noise level output device 510. The switching conditions of the DLL 102 are defined using the noise data measured by the noise level output device 510. Therefore, the DLL 102 can be correctly switched.

Figure 6:
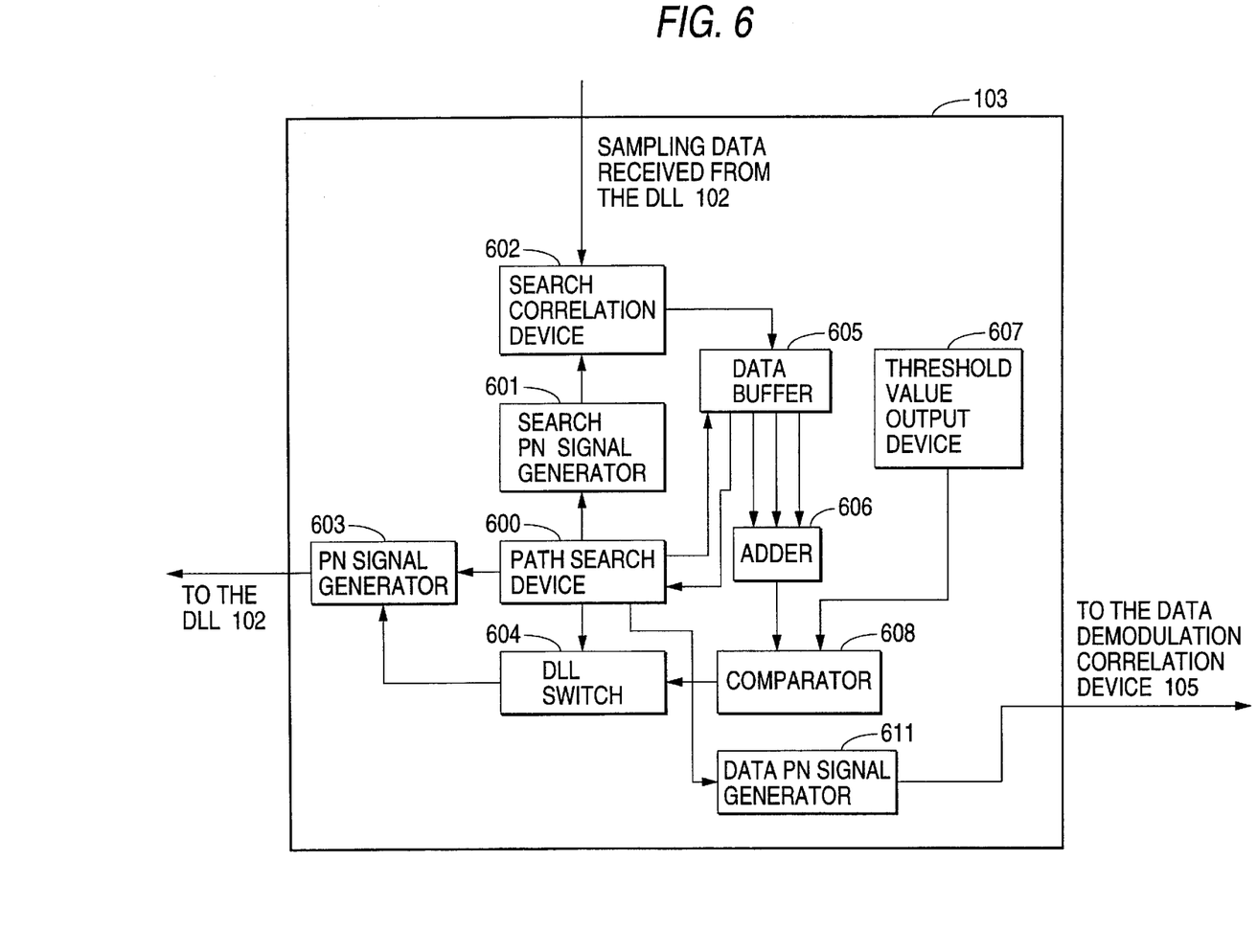
FIG. 6 is a detailed block diagram of a search unit according to a fifth embodiment of the receiver synchronizer of the spread spectrum communication apparatus of the present invention.

With reference to FIG. 6, an explanation will be given of the configuration of the search unit according to the fifth embodiment of the receiver synchronizer of the spread spectrum communication apparatus of the present invention illustrated in FIG. 1. The search unit 103 illustrated in FIG. 6 shows the search unit 103 provided in FIG. 1 in detail. In FIG. 6, reference numeral 601 designates a search PN signal generator for generating PN signals with regard to all PN phases; 602, a search correlation unit which correlates the received sampling data with the PN signal having the PN phase actually received from the search PN signal generator 601 and outputs resultant correlation data; 605, a data buffer for storing correlation data which are search results received from the search correlation unit 602; and 603, a PN signal generator for generating a PN signal output to the DLL 102.

Further, reference numeral 600 designates a path search unit which controls the search PN signal generator 601, searches the maximum power path from the correlation data stored in the data buffer 605 and outputs the PN phase of the thus-searched maximum power path; 604, a DLL switch which switches the PN phase of the PN signal output to the DLL 102 to the phase of the maximum power path for each search across all the PN phases on the basis of the result of the path searching operation performed by the path search unit 600; 606, an adder for calculating the sum of first through Nth sampled correlation data as the center is the PN phase of the PN signal output to the PN signal generator 603; 607, a threshold value output device for outputting a fixed threshold value; 608, a comparator for determining whether or not the PN phase of the PN signal output to the DLL 102 is switched by comparing the output of the adder 606 with the threshold value output from the threshold value output device 607; and 611, a data PN signal generator for generating a PN signal output to the data demodulation correlation device 105.

Next, with reference to FIGS. 1 and 6, the operation of the receiver synchronizer of the spread spectrum communication apparatus of the fifth embodiment of the present invention will be described. First, while the DLL 102 is placed in an inoperative state, the timing of the sampling clock signal generator 104 which is currently in operation and controls the sampling timing of the A/D converter 101 is made constant. A received signal is sampled at predetermined timing by the A/D converter 101. Then, thus sampled received signal enters the search unit 103.

The search correlation unit 602 correlates the sampling data input to the search unit 103 with the PN signal output from the search PN signal generator 601. The correlation data output from the search correlation unit 602 is stored in the data buffer 605. When the correlation data regarding all the PN phases are stored in the data buffer 605, the path search unit 600 selects the maximum-power path from the correlation data. The PN phase of the maximum power path is output to the PN signal generator 603, thereby activating the DLL 102 so as to commence a tracking operation.

The PN phase of the maximum power path is always output to the data PN signal generator 611, thereby commencing demodulation of the data. In other words, the spread spectrum communication apparatus is provided with another PN signal generator aside from the PN signal generator 603 for use with the DLL 102. Even during the tracking operation, the search unit 103 remains in operation. When the correlation data regarding all the PN phases are stored in the data buffer 605, the path search unit 600 selects the maximum power path from the correlation data. The PN phase of thus selected maximum power path is output to the data PN signal generator 611.

Read from the data buffer 605 are the outputs of the correlation device regarding the first to Nth sampled correlation data as the center is the PN phase of the PN signal output to the PN signal generator 603. Thus read correlation data are added up by the adder 606. The comparator 608 compares the threshold value output from the threshold value output device 607 with the output of the adder 606. The moment the output of the adder 606 falls to less than the threshold value, the PN phase of the maximum power path read from the data buffer 605 is output from the path search unit 600 to the PN signal generator 603 under control of the DLL switch 604 which receives the comparison result from the comparator 608.

As described above, in the spread spectrum communication apparatus according to the fifth embodiment of the present invention, the phase of the PN signal to be output to the DLL 102 is independent of the phase of the PN signal for use in demodulating data. If the sum of the first to Nth sampled electric power as the center is the phase of the PN signal output to the DLL 102 falls to less than the fixed value, the DLL switch 604 switches the PN phase of the PN signal output from the PN signal generator 603 to the DLL to the phase of the maximum power path. Accordingly, the spread spectrum communication apparatus separately has the DLL 102 and the PN signal generator for data demodulation. Therefore, even if the time constant of the loop filter of the DLL 102 is large, data can be demodulated without being affected by drifts caused by the DLL 102. Consequently, superior receiving characteristics can be obtained.

Figure 7:
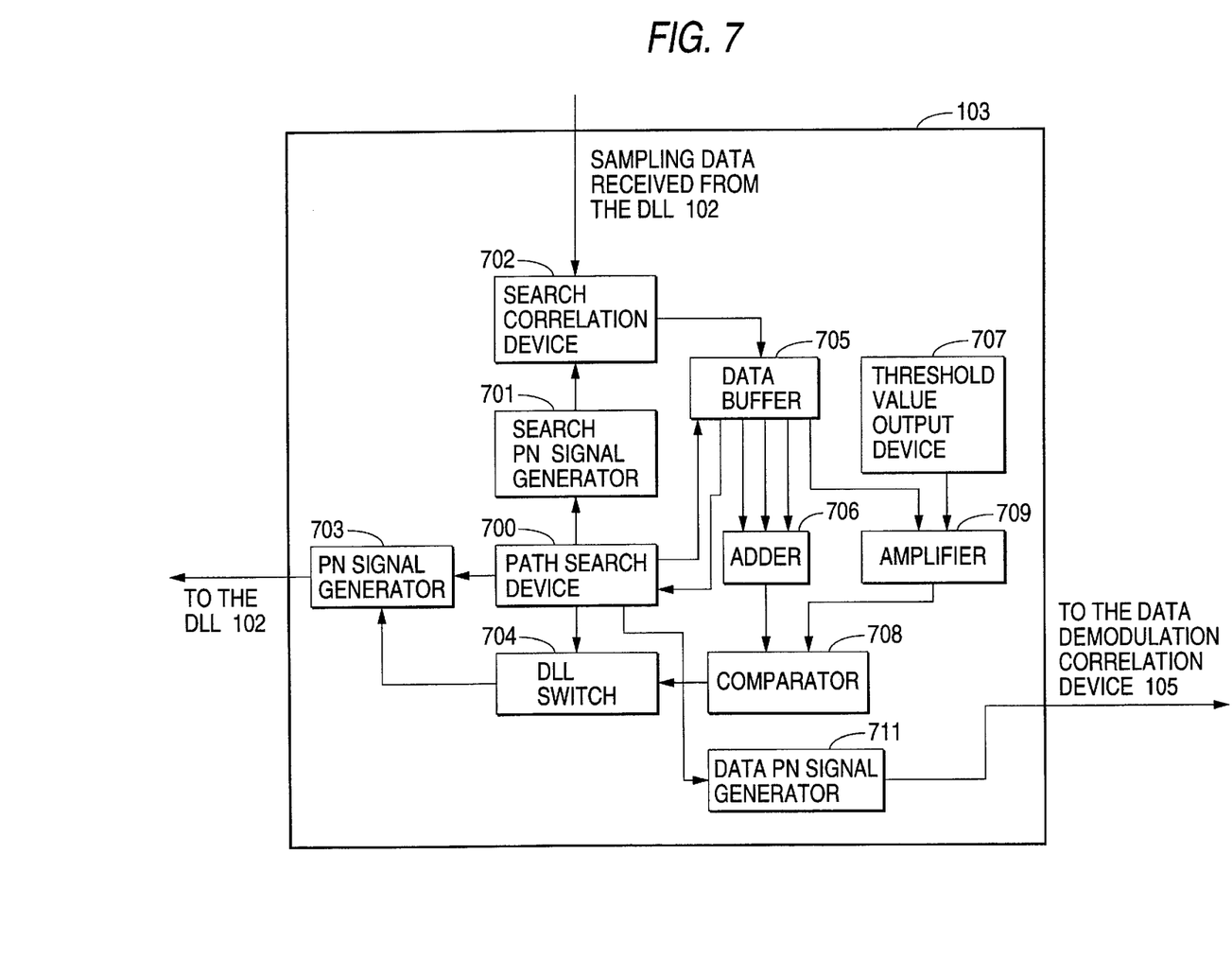
FIG. 7 is a detailed block diagram of a search unit according to a sixth embodiment of the receiver synchronizer of the spread spectrum communication apparatus of the present invention.

With reference to FIG. 7, an explanation will be given of the configuration of the search unit according to the sixth embodiment of the receiver synchronizer of the spread spectrum communication apparatus of the present invention illustrated in FIG. 1. The search unit 103 illustrated in FIG. 7 shows the search unit 103 provided in FIG. 1 in detail. In FIG. 7, reference numeral 701 designates a search PN signal generator for generating PN signals with regard to all PN phases; 702, a search correlation unit which correlates the received sampling data with the PN signal having the PN phase actually received from the search PN signal generator 701 and outputs resultant correlation data; 705, designates a data buffer for storing correlation data which are search results received from the search correlation unit 702; and 703, a PN signal generator for generating a PN signal output to the DLL 102.

Further, reference numeral 700 designates a path search unit which controls the search PN signal generator 701, searches the maximum power path from the correlation data stored in the data buffer 705, and outputs the PN phase of the thus-searched maximum power path; 704, a DLL switch which switches the PN phase of the PN signal output to the DLL 102 to the phase of the maximum power path for each search across all the PN phases on the basis of the result of the path searching operation performed by the path search unit 700; 706, an adder for calculating the sum of first through Nth sampled correlation data as the center is the PN phase of the PN signal output to the PN signal generator 703; 707, a threshold value output device for outputting a fixed threshold value; 709, a multiplier for multiplying the output of the correlation device regarding the maximum power path selected by the path search unit 700 by the fixed threshold value; 708, a comparator for determining whether or not the PN phase of the PN signal output to the DLL 102 is switched by comparing the output of the adder 706 with an output of the multiplier 706; and 711, a data PN signal generator for generating a PN signal output to the data demodulation correlation device 105.

Next, with reference to FIGS. 1 and 7, the operation of the receiver synchronizer of the spread spectrum communication apparatus of the sixth embodiment of the present invention will be described. First, while the DLL 102 is placed in an inoperative state, the timing of the sampling clock signal generator 104 which is currently in operation and controls the sampling timing of the A/D converter 101 is made constant. A received signal is sampled at predetermined timing by the A/D converter 101, and thus sampled received signal enters the search unit 103.

The search correlation unit 702 correlates the sampling data input to the search unit 103 with the PN signal output from the search PN signal generator 701. The correlation data output from the search correlation unit 702 is stored in the data buffer 705. When the correlation data regarding all the PN phases are stored in the data buffer 705, the path search unit 700 selects the maximum-power path from the correlation data. The PN phase of the maximum power path is output to the PN signal generator 703 thereby to activate the DLL 102 so as to commence a tracking operation.

The PN phase of the maximum power path is always output to the data PN signal generator 711, thereby commencing demodulation of the data. In other words, the spread spectrum communication apparatus is provided with another PN signal generator aside from the PN signal generator 703 for use with the DLL 102. Even during the tracking operation, the search unit 103 remains in operation. When the correlation data regarding all the PN phases are stored in the data buffer 705, the path search unit 700 selects the maximum power path from the correlation data. The PN phase of thus selected maximum power path is output to the data PN signal generator 711.

Read from the data buffer 705 are the outputs of the correlation device regarding the first to Nth sampled correlation data as the center is the PN phase of the PN signal output to the PN signal generator 703. Thus read correlation data are added up by the adder 706. The output of the correlation device regarding the maximum power path selected by the path search unit 700 is read from the data buffer 705. The multiplier 709 multiplies thus read output by the threshold value output from the threshold output device 707. The comparator 708 compares the output of the multiplier 709 with the output of the adder 706. The moment the output of the adder 706 falls to less than the threshold value output from the multiplier 709, the PN phase of the maximum power path read from the data buffer 705 is output from the path search unit 700 to the PN signal generator 703 under control of the DLL switch 704 which receives the comparison result from the comparator 708.

As described above, in the spread spectrum communication apparatus according to the sixth aspect of the present invention, the phase of the PN signal output to DLL 102 is independent of the phase of the PN signal for use in demodulating data. The apparatus is provided with the DLL switch 704 in which the sum of the first to Nth sampled electric power as the center is the phase of the PN signal output to the DLL 102 falls to less than X % of the maximum power path. As a result, the data can be demodulated without being affected by drifts resulting from switching of the DLL 102, thereby enabling stable control operations of the DLL 102.

Figure 8:
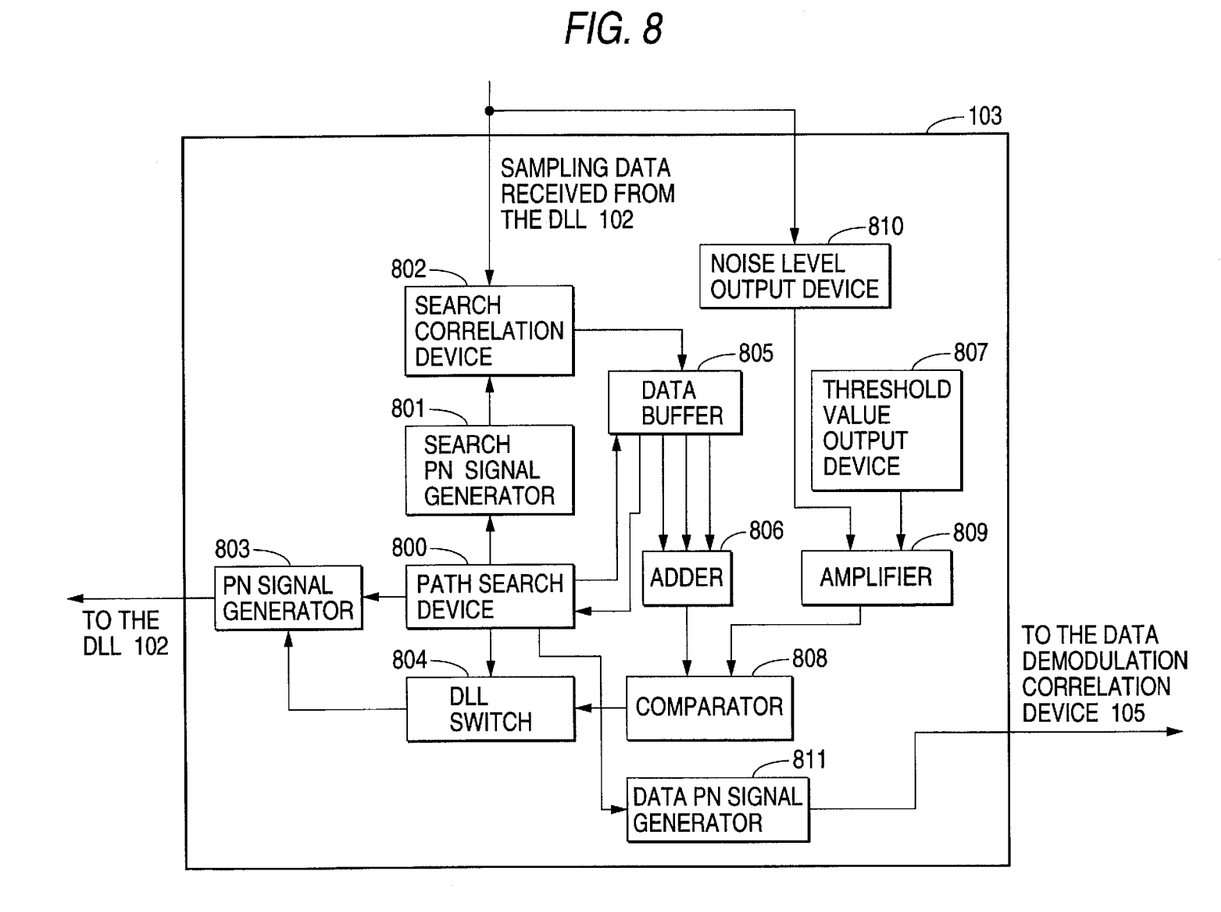
FIG. 8 is a detailed block diagram of a search unit according to a seventh embodiment of the receiver synchronizer of the spread spectrum communication apparatus of the present invention.

With reference to FIG. 8, an explanation will be given of the configuration of the search unit according to the seventh embodiment of the receiver synchronizer of the spread spectrum communication apparatus of the present invention illustrated in FIG. 1. The search unit 103 illustrated in FIG. 8 shows the search unit 103 provided in FIG. 1 in detail. In FIG. 8, reference numeral 801 designates a search PN signal generator for generating PN signals with regard to all PN phases; 802, a search correlation unit which correlates the received sampling data with the PN signal having the PN phase actually received from the search PN signal generator 801 and outputs resultant correlation data; 805, a data buffer for storing correlation data which are search results received from the search correlation unit 802; and 803, a PN signal generator for generating a PN signal output to the DLL 102.

Further, reference numeral 800 designates a path search unit which controls the search PN signal generator 801, searches the maximum power path from the correlation data stored in the data buffer 805, and outputs the PN phase of the thus-searched maximum power path; 804, a DLL switch which switches the PN phase of the PN signal output to the DLL 102 to the phase of the maximum power path for each search across all the PN phases on the basis of the result of the path searching operation performed by the path search unit 800; 806, an adder for calculating the sum of first through Nth sampled correlation data as the center is the PN phase of the PN signal output to the-PN signal generator 803; 807, a threshold value output device for outputting a fixed threshold value; 810 designates a noise level output device for outputting a noise level by measuring the level of noise of the sampling data; 809, a multiplier for multiplying the output of the noise level output device 810 by the fixed threshold value of the threshold value output device 807; 808, a comparator for determining whether or not the PN phase of the PN signal output to the DLL 102 is switched by comparing the output of the adder 806 with the output of the multiplier 809; and 811, a data PN signal generator for generating a PN signal output to the data demodulation correlation device 105.

Next, with reference to FIGS. 1 and 8, the operation of the receiver synchronizer of the spread spectrum communication apparatus of the seventh embodiment of the present invention will be described. First, while the DLL 102 is placed in an inoperative state, the timing of the sampling clock signal generator 104 which is currently in operation and controls the sampling timing of the A/D converter 101 is made constant. A received signal is sampled at predetermined timing by the A/D converter 101, and thus sampled received signal is input into the search unit 103.

The search correlation unit 802 correlates the sampling data input to the search unit 103 with the PN signal output from the search PN signal generator 801. The correlation data output from the search correlation unit 802 is stored in the data buffer 805. At the point in time when the correlation data regarding all the PN phases have been stored in the data buffer 805, the path search unit 800 selects the maximum-power path from the correlation data. The PN phase of the maximum power path is output to the PN signal generator 803 thereby to activate the DLL 102 so as to commence a tracking operation.

The PN phase of the maximum power path is always output to the data PN signal generator 811, thereby commencing demodulation of the data. In other words, the spread spectrum communication apparatus is provided with another PN signal generator aside from the PN signal generator 803 for use with the DLL 102. Even during the tracking operation, the search unit 103 remains in operation. When the correlation data regarding all the PN phases are stored in the data buffer 805, the path search unit 800 selects the maximum power path from the correlation data. The PN phase of thus selected maximum power path is output to the data PN signal generator 811.

Read from the data buffer 805 are the outputs of the correlation device regarding the first to Nth sampled correlation data as the center is the PN phase of the PN signal output to the PN signal generator 803. Thus read correlation data are added up by the adder 806. The multiplier 809 multiplies the noise level measured and output from the noise level output device 810 by the threshold value output from the threshold value output device 807. The comparator 808 compares the output of the multiplier 809 with the output of the adder 806. The moment the output of the adder 806 falls to less than the threshold value output from the multiplier 809, the PN phase of the maximum power path read from the data buffer 805 is output from the path search unit 800 to the PN signal generator 803 under control of the DLL switch 804 which receives the comparison result from the comparator 808;

As described above, in the spread spectrum communication apparatus according to the seventh embodiment of the present invention, the phase of the PN signal output to the DLL 102 is independent of the phase of the PN signal for use in demodulating data. The apparatus is provided with the DLL switch 804 which switches the PN phase of the PN signal output from the PN signal generator 803 to the DLL 102 to the phase of the maximum power path in which if the sum of the first to Nth sampled electric power as the center is the phase of the PN signal output to the DLL 102 falls to less than X % of the level of noise of the sampling data measured by the noise level output device 810. As a result, data can be demodulated without being affected by drifts resulting from switching of the DLL 102, and correct switching of the DLL 102 can be carried out.

The spread spectrum communication apparatus according to the present invention has the above described configuration. Particularly, the apparatus is provided with the switching unit for always switching the phase of the PN signal output to the DLL to the phase of the path having the maximum-power (maximum-power path) while the phase of the PN signal output to the DLL is set to be the same as or independent of the phase of the PN signal for use in demodulating data. Accordingly, the phase of the PN signal output to the DLL is switched to the other currently-existing maximum power path before the DLL comes out of synchronization with the path. Even if the DLL comes out of synchronization with the path, the DLL can be brought in synchronization with the path again by immediately switching the phase of the PN signal output to the DLL to the phase of the currently-existing maximum power path.

What is claimed is:

1. A synchronizer for a receiver of a spread spectrum communication apparatus comprising:

A/D converting means;

tracking means for time tracking a PN signal with respect to sampling data received from said A/D converter;

search means for searching a path from which a received signal having the maximum electric power is obtained; and data demodulation correlation means for demodulating the received signal by despreading;

wherein said search means comprises:

PN signal output means for searching the PN phase of the maximum power path from correlation data obtained by correlating the PN signal of each PN phase with the sampling data, and outputting the PN signal having the PN phase to the DLL and the data demodulation correlation device; and PN signal switching means for switching the PN phase of the PN signal output from said PN signal output means to the phase of the maximum power path;

further wherein the PN phase of the PN signal is always in synchronization with the phase of the maximum power path.

2. A synchronizer according to claim 1, wherein said PN signal output means comprises:

search PN signal generating means for generating the PN signal having the PN phase;

search correlation means for outputting correlation data by correlating the sampling data with the PN signal;

data storage means for storing the correlation data;

path search means for searching the correlation data on the maximum power path from said data storage means and outputting the PN phase of the path; and PN signal generating means for outputs the PN signal with the PN phase received from said path search means to said tracking means and said data demodulation correlation means;

further wherein said PN signal switching means comprises tracking switching means for switching the PN phase of the PN signal output from said PN signal generating means to the phase of the maximum power path.

3. A synchronizer according to claim 2, wherein said PN signal switching means further comprises:

adding means for reading the correlation data of at least one sample as the center is the phase of the PN signal output to said PN signal generating means and calculating the sum of the read correlation data;

threshold output means for outputting a predetermined threshold value;

comparing means for determining whether or not the PN signal output to said tracking means is switched by comparing the output of said adding means with a predetermined threshold value, and controlling said tracking switch means;

further wherein the PN phase of the PN signal is switched to the phase of the maximum power path when the output of said adding means falls to less than the predetermined threshold value.

4. A synchronizer according to claim 2, wherein said PN signal switching means further comprises:

adding means for reading the correlation data of at least one sample as the center is the phase of the PN signal output to said PN signal generating means and calculating the sum of the read correlation data;

threshold output means for outputting a predetermined threshold value;

multiplying means for multiplying the correlation data on the maximum power path read from said data storage means by the predetermined threshold value; and comparing means for determining whether or not the PN signal output to said tracking means is switched by comparing the output of said adding means with the threshold value of said multiplying means to control said tracking switching means;

further wherein the PN phase of the PN signal is switched to the phase of the maximum power path when the output of said adding means falls to less than a predetermined percentage of the maximum power path.

5. A synchronizer according to claim 2, wherein said PN signal switching means further comprises:

adding means for reading the correlation data of at least one sample as the center is the phase of the PN signal output to said PN signal generating means and calculating the sum of the read correlation data;

threshold output means for outputting a predetermined threshold value;

noise level output means for measuring a level of noise included in the sampling data and outputting the measured noise level;

multiplying means for multiplying the output of the noise level output means by the predetermined threshold value; and comparing means for determining whether or not the PN signal output to said tracking means is switched by comparing the output of said adding means with the threshold value of said multiplying means to control said tracking switching means;

further wherein the PN phase of the PN signal is switched to the phase of the maximum power path when the output of said adding means falls to less than a predetermined percentage of the measured noise level.

6. A synchronizer according to claim 2, wherein said PN signal switching means further comprises:

adding means for reading the correlation data of at least one sample as the center is the phase of the PN signal output to said PN signal generating means and calculating the sum of the read correlation data;

threshold output means for outputting a predetermined threshold value; and comparing means for determining whether or not the PN signal output to said tracking means is switched by comparing the output of said adding means with the predetermined threshold value to control said tracking switching means; and said search means further comprises data PN signal generating means for generating the PN signal to be output to said data demodulation correlation means instead of said PN signal generating means;

wherein the PN phase of the PN signal output to said tracking means is switched to the phase of the maximum power path independently of the PN signal output to said data demodulation correlation means when the output of said adding means falls to less than the predetermined threshold value.

7. A synchronizer according to claim 2, wherein said PN signal switching means further comprises:

adding means for reading the correlation data of at least one sample as the center is the phase of the PN signal output to said PN signal generating means and calculating the sum of the read correlation data;

threshold output means for outputting a predetermined threshold value;

multiplying means for multiplying the correlation data on the maximum power path read from said data storage means by the predetermined threshold value; and comparing means for determining whether or not the PN signal output to said tracking means is switched by comparing the output of said adding means with the threshold value of the multiplying means to control said tracking switching means; and said search means comprises data PN signal generating means for generating the PN signal to be output to the data demodulation correlation means instead of said PN signal generating means;

wherein the PN phase of the PN signal output to said tracking means is switched to the phase of the maximum power path independently of the PN signal output to the data demodulation correlation means when the output of said adding means falls to less than a predetermined percentage of the maximum power path.

8. A synchronizer according to claim 2, wherein said PN signal switching means further comprises:

adding means for reading the correlation data of at least one sample as the center is the phase of the PN signal output to said PN signal generating means and calculating the sum of the read correlation data;

threshold output means for outputting a predetermined threshold value;

noise level output means for measuring a level of noise included in the sampling data and outputting the measured noise level;

multiplying means for multiplying the output of said noise level output means by the predetermined threshold value; and comparing means for determining whether or not the PN signal output to said tracking means is switched by comparing the output of said adding means with the threshold value of said multiplying means to control said tracking switching means; and said search means further comprises a data PN signal generating means for generating the PN signal to be output to the data demodulation correlation means instead of the PN signal generating means;

wherein the PN phase of the PN signal output to said tracking means is switched to the phase of the maximum power path independently of the PN signal output to the data demodulation correlation means when the output of said adding means falls to less than a predetermined value of the maximum power path.

* * * * *